United States Patent [19]

Kuehn

[11] 4,304,707

[45] Dec. 8, 1981

[54] RUST INHIBITING COATING COMPOSITIONS

[75] Inventor: Erich Kuehn, Wilmington, Del.

[73] Assignee: ICI Americas Inc., Wilmington, Del.

[21] Appl. No.: 164,298

[22] Filed: Jun. 30, 1980

Related U.S. Application Data

[63] Continuation of Ser. No. 19,447, Mar. 12, 1979, abandoned.

[51] Int. Cl.³ .............................................. C08L 15/00
[52] U.S. Cl. .............................. 260/37 R; 106/14.36; 106/306; 252/389 R; 252/396; 260/37 EP; 260/40 R; 260/42
[58] Field of Search ............... 106/14.23, 14.28, 14.36, 106/253, 306, 264, 311; 260/37 EP, 37 R, 40 R, 42; 252/389 R, 396

[56] References Cited

U.S. PATENT DOCUMENTS

| | | | |
|---|---|---|---|
| 2,285,752 | 6/1942 | Van Ess | 106/14.26 |
| 2,392,102 | 1/1946 | Ruedrich | 106/14.26 |
| 2,409,950 | 10/1946 | Meyer | 106/14.28 |
| 2,420,127 | 5/1947 | Doelling | 106/14.26 |
| 2,479,988 | 8/1949 | Williams et al. | 106/14.25 |
| 2,509,786 | 5/1950 | Schiermeier et al. | 106/14.27 |
| 2,573,878 | 11/1951 | Schiermeier et al. | 106/14.27 |
| 2,776,917 | 1/1957 | Shnitzler et al. | 106/14.28 |
| 3,007,880 | 11/1961 | Hartung | 252/389 |
| 3,072,572 | 1/1963 | Cantrell et al. | 106/14.31 |
| 3,405,072 | 10/1968 | Kinnavy | 252/389 |
| 3,421,908 | 1/1969 | Rusher | 106/14.16 |
| 3,585,159 | 6/1971 | Mihara | 260/19 |
| 3,598,616 | 8/1971 | Gibson et al. | 106/14.39 |
| 3,699,052 | 10/1972 | Petrey et al. | 252/389 |
| 3,726,694 | 4/1973 | Moore et al. | 106/14.26 |
| 3,874,883 | 4/1975 | Robitaille et al. | 106/14.21 |

*Primary Examiner*—Lorenzo B. Hayes

[57] ABSTRACT

Paint formulations containing barium salts of hydroxy acids such as citric, tartaric, salicyclic, alizarine, quinizarine, and chloranilic in their anhydrous or hydrated forms are useful as primer coats for inhibiting rust for time periods equivalent to or better than those primers containing oxides and salts of lead. Barium salt mixtures, coprecipitated blends and barium salt coated substrates are particularly useful as paint additives.

11 Claims, No Drawings

RUST INHIBITING COATING COMPOSITIONS

This is a continuation, of application Ser. No. 019,447, filed Mar. 12, 1979, now abandoned.

This invention relates to corrosion resistant or rust preventing metal coating compositions useful in inhibiting corrosion and rust formation of painted articles. In particular it is directed to coating compositions containing barium salts of organic hydroxy acids and there hydrates. The invention is also directed to a method of inhibiting corrosion in ferrous metals by the application of a nontoxic lead-free corrosion resistant barium salt-containing coating to the surface of the metals.

Presently available corrosion inhibiting compounds, such as red lead, zinc chromate and lead chromate, act as anodic inhibitors against corrosion. Heretofore, the substitution of non-toxic inexpensive fillers and anti-corrosion pigments for these toxic materials has not been successful since their use results in a reduction in corrosion resistance.

It is therefore an object of the present invention to provide a method for increasing the corrosion inhibition of metal by applying a novel film-forming composition over its surface.

Another object provides a novel corrosion inhibiting composition.

It is an additional object to provide a pigment which inhibits corrosion when incorporated in a film-forming resin binder paint formulation. Pigment blends coprecipitated on inert substrates are also included.

These and other objects of the invention are realized by applying to metals paint systems containing an effective amount about 5–95% by weight of a barium salt of a carbonyl group containing organic compound having at least one acidic hydroxy hydrogen. Representative of such compounds are substantially water insoluble hydrous and anhydrous barium salts of organic acids, such as citric acid, tartaric acid, salicylic acid, alizarine (1,2 dihydroxy-9,10-anthraquinone), quinizarine (1,4-dihydroxy-9,10-anthraquinone), chloranilic acid (2,5-dichloro-3,6 dihydroxyquinone), alizarincarboxylic acid (5,6 or 7,8)dihydroxy-2-anthraquinone-carboxylic acid and blends thereof. Surprisingly, such barium salts when incorporated in films which contact metal surfaces, particularly iron and steel surfaces, offer a method for inhibiting corrosion equivalent to or better than most toxic lead and chromium-containing pigments.

Barium salts have been known for some time to be suitable pigments in the formation of corrosion inhibiting paints, such as described in U.S. Pat. Nos. 2,392,102; 2,409,950; 2,479,988; 2,573,878; 3,007,880; 3,598,616; 3,673,229; 3,726,694; 3,874,883 to name a few. Hydroxy acids and quinoid compounds are known to inhibit corrosion, such as described in U.S. Pat. Nos. 2,366,074, 3,421,908, 3,585,159, and 3,699,052. Furthermore, barium salts of organic acids have been shown to be effective anti-corrosion agents as exemplified in U.S. Pat. Nos. 2,285,752, 2,509,786, 3,072,572, 3,137,583, and 3,405,072. In one instance, U.S. Pat. No. 2,420,127 indicates that an ethylenically unsaturated 12 hydroxy organic acid (ricinoleic) is useful as a corrosion inhibitor in the form of an alkaline earth metal salt when combined in a blown castor oil grease which is applied to metallic components for storage and shipping.

The barium salts of the present invention differ from those of the prior art in that they are products of basic barium compounds, such as barium hydroxide, barium oxide and barium salts and organic materials having acidic hydroxide groups in a specific relationship with a carbonyl group. These organic compounds usually have in the range of 2–40 carbon atoms, and may be saturated, ethylenically unsaturated and aromatic. Preferred organic acids have a molecular weight in the range of 73–350. Carbonyl groups may be present as carboxy ester, carboxyl, aldo, keto, and amido. Hydroxyl groups may be attached to a $\beta$ carbon when said organic compounds is saturated; in the y position when ethylenic unsaturation separates the hydroxyl-containing carbon from the carbonyl carbon; or in the $\beta$, $\lambda$, or $\Delta$ position when separated by aromatic unsaturation, such as exemplified in the following corresponding structures:

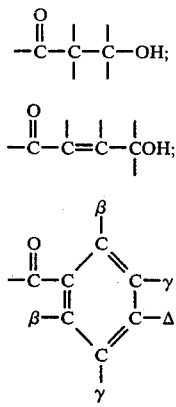

In addition to barium salts of the compounds mentioned above, barium salts of other materials, such as glutaric acid, glycolic acid, glyceraldehyde, glyceric acid, malic acid, gluconic acid, and $\beta$-hydroxy propanoic acid, to name a few, are additional examples of materials which would be effective either as anhydrous or hydrated salts of barium as sole ingredients, blends or deposits on inert or active substrates.

The corrosion resistant film formulations can be applied directly to the bare metal or over an adhesion promoting primer. The preferable choice of application is the direct coating of a clean grease-free metal surface, however, many industrial applications require a stronger bond of paint to metal. This is generally achieved by employing an adhesive promoting primer which contains the corrosion inhibiting pigments. However, if acrylic latex or chlorinated rubber type binder resins are employed, no primer coat is required in addition to the corrosion inhibitor. The barium salt pigments are usually employed in coating compositions in amounts ranging from 5–95 percent by weight, however, smaller amounts in the order of 0.5 percent by weight are effective in some instances.

The binder resin base for the instant coating formulations can be any of the air dried oil type, acrylic resin type, an alkyd resin base, an epoxy resin base, a polyvinyl acetate base, a latex rubber or chlorinated rubber base, and any other suitable resin formula normally intended for use in preparing coatings for metal surfaces. Such materials are readily available commercially and are well-known to the art. They may be first applied as a barium salt containing primer coat for which a top coat is intended.

In addition to the barium salts may be included pigments, fillers, dyes, coloring agents, such as titanium dioxide, zinc oxide, magnesium silicate, silica, mica, calcium carbonate, fungicides, algaecides, and compatible thinners normally employed with the base resin binder chosen.

The barium salts of the organic materials are usually formed by adding solutions containing basic barium compounds to solutions containing the above described organic acidic materials or their soluble salts. The precipitated barium salt is filtered, washed and dried by conventional techniques.

Preferred techniques include coprecipitation of mixtures of carbonyl-hydroxy organic compounds having 2–40 carbon atoms with barium hydroxide. Furthermore, these barium salts can be precipitated in slurries of active or inert particulate materials such as clay, silica, alumina, carbon, glass, inorganic pigments, organic resins and other water insoluble salts so that the active barium compound is formed on the surface of the particulate substrate or upon another active barium salt substrate. Such materials having at least 0.1% barium by weight can be effective.

Hydrated barium salts of the invention can be prepared along the lines of the following preparative examples which lead to the formation of various hydrated barium salts containing 1–8 molecules of water. Any suitable preparative method can be used in place thereof and the invention should not be limited to the barium compounds made according to the following procedure:

Preparation 1—Barium Citrate

Into a glass beaker is intermixed citric acid and barium hydroxide 8 hydrate $(Ba(OH)_2.8H_2O)$ in a mol ratio of 1/1.5 by intermixing 300 grams of distilled water, 96 grams citric acid and 236.6 grams of barium hydroxide 8 hydrate heated to a temperature of 58° C. Upon precipitation of the barium citrate, 100 grams of distilled water is added whereupon the white pasty pigment slurry is then held for an additional hour at 70°–90° C. A total of 294.6 grams of a white fluffy powder is obtained which corresponds to a yield of 92% of hydrated barium citrate. Analysis: 47.45% . $Ba_3C_{12}O_{14}H_{10}$.

Preparation 2—Barium Tartrate

Hydrated barium tartrate is prepared by intermixing 315.5 grams barium hydroxide 8 hydrate, 150 grams of tartaric acid and 400 grams of water with stirring at 50° C. Upon thickening, another 100 grams of distilled water is added and further heated to about 80°–95° C. for 1 hour. The slurry is cooled to 1° C. and filtered. Filter cake resulting from vacuum drying overnight at 90°–95° C. was 288 grams of fine powder $Ba_2(C_4H_4O_6)_2.2H_2O$,

Preparation 3—Barium Salicylate

Hydrated barium salicylate is prepared by the intermixing of 157.75 grams of barium hydroxide 8 hydrate, 69.06 grams of salicylic acid and 350 grams of distilled water. Barium salicylate precipitates as a white slurry upon heating and stirring for one hour at 75°–95° C. Upon cooling, filtering and drying in a vacuum oven at 90°–95° C. overnight a 140.5 grams of hydrated barium salt is obtained. $Ba(C_6H_4OHCO_2)_2.H_2O$.

Preparation 4—Barium Alizarate

The barium salt of alizarine (1,2 dihydroxy-9,10-anthraquinone) is prepared by intermixing a 2-1 mol ratio of alizarine and barium hydroxide octahydrate (240.22 grams of alizarine and 175.75 grams barium hydroxide 8 hydrate) in 600 ml. of water in a 2 l. glass beaker. The mixture turns purple upon the formation of a pasty mixture. The slurry is stirred for an additional 2 hours at 90° C. and filtered at room temperature, after-which the filter cake is dried at 90°–95° C. overnight in a vacuum oven to yield 237.2 grams of fine free-flowing powder $Ba[C_6H_4(CO)_2C_6H_2O_2]_2$.

Preparation 5—Barium Quinizarate

The barium salt of quinizarine (1,4-dihydroxy 9,10-anthraquinone) is prepared by dissolving in 350 grams of water, 84.5 grams of barium hydroxide 8 hydrate and 115.5 grams of quinizarine at a temperature of 40° C. A dark purple precipitate forms immediately. The slurry is then stirred at 95° C. for a period of 1 hour after which it is filtered, washed, and dried. 151.2 grams of a dark purple free-flowing pigment is obtained. Analysis 23.9% Ba.

Preparation 6—Barium Salt Coated Substrate

As pointed out previously, it may be desirable to precipitate active corrosion resistant barium compounds on to inert carriers. A pigment consisting of 60 percent by weight alumina trihydrate (Alcoa C-331), 30 percent by weight barium citrate and 10 percent by weight barium alizarate is made as follows: 72.4 grams of barium hydroxide 8 hydrate is dissolved in 300 ml. of distilled water in a 1 liter beaker at 50° C. Into this is stirred 103 grams of alumina trihydrate. This slurry is heated to 70° C. and thereafter 50 grams of an aqueous solution containing 4.32 grams citric acid and 15 grams of alizarine are added simultaneously with vigorous stirring. The color of the slurry turns purple and an increase in viscosity is noted. Another 200 ml. of water is added and heated to a temperature of 90°–95° C. and held for 1 hour. The pigment slurry is then cooled and filtered, washed repeatedly with water, and dried overnight at 90° C. After grinding the pigment in a mortar and pestle, 134 grams of a uniformly purple colored free-flowing pigment is obtained. The pigment can be employed in corrosion resistant coatings as shown in Example 7.

As demonstrated in Preparation 6, similar inert substances, such as previously described, can be coated with single or multiple component active barium corrosion inhibiting salts.

Coating Examples

Examples 1 thru 7 of Table II and demonstration Example (A) thru (I) of Table I serve to show the improvement offered by the coating compositions of the invention over those materials used as anti-corrosive pigments in conventional commercial formulations and which are considered to be the best available in industry.

In Tables I and II are indicated the compositions of the demonstrations examples as well as those of the present invention when incorporated in rubber base coating formulations and thereafter subjected to salt spray tests as described in ASTM B-117-73 for 1,000 hours.

The coating compositions were prepared by mixing 40 parts by weight of pigment indicated with 60 parts by weight of a chlorinated rubber solution made by mixing 266 parts by weight Alloprene X-20 (a commercially available chlorinated rubber); 134 parts by weight Cerechlor 42P (a commercially available chlorinated plasticizer; 400 parts by weight Solvesso 100 (a commercially available petroleum solvent); 200 parts by weight Atlantic 57 (a commercially available petroleum solvent); 140 parts by weight xylene and 60 parts by weight Butyl Cellosolve (a polyoxyalkylated butyl alcohol solvent). The pigment compositions and chlorinated rubber solutions were ground together in ball mills for 24 hours using porcelain pebbles as grinding media. The pigmented coatings were filtered through a cheese-cloth type paint strainer and adjusted to a brushable viscosity using small amounts of the following solvent blend: 200 parts by weight of Atlantic 57; 400 parts by weight of Solvesso 100; 140 parts by weight of Xylene; and 60 parts by weight of Butyl cellosolve.

Brushed coatings are applied to 7.5 cm×15 cm low carbon steel panels, i.e. two brush coats within 24 hours to meet requirements of ASTM A-366. All panels are washed with acetone before painting with two coats of coating composition. Back, sides and edges of the panels are coated with a red lead primer and a white alkyd base coating for general protection. After conditioning the panels at room temperature for two weeks, the test side coatings are cut diagonally with a razor blade to the bare metal forming a figure X with the intersection meeting at the center of the panel on the test coating side.

The test side was exposed to a salt spray test as described in ASTM B-117-73. After exposure the test coatings are removed with the above described solvent blend, dried and rated as described below. This procedure is used for all test panels.

The following rating system was adopted to measure corrosion resistance. The amount of rust was measured in millimeters along the X-cut at its farthest extension. The blank areas along side of the X-cut were visibly inspected for rust spots, discoloration, etc. A final overall rating system was used to rate the appearance of the test panels.

A—Excellent, no rust along X and no rust on surface.
B—Good, very little rust along X and no rust on surface.
C—Fair, moderate rust along X and some rust spots.
D—Poor, heavy rust along X or badly rusted surface.

The salt spray results are indicated in Tables I and II. The nine demonstrations (A thru I) indicated that commercially available pigments are relatively poor as compared to the pigments of the invention as indicated in Table II. The barium salts are nearly successful in preventing rust entirely. It is expected that more rust will occur along the edge of the panel where coatings are thin.

EXAMPLES 8–12

Tables III and IV identify chlorinated rubber coatings exposed to a heavy industrial atmosphere at Atlas Point in Wilmington, Delaware, U.S.A., located at the waterfront next to the Delaware Memorial Bridges. The coating compositions were prepared at a 1/1 pigment/binder ratio by mixing the ingredients in a ball mill for 24 hours using porcelain pebbles as grinding media. The pigmented coatings were filtered through a cheese-cloth paint strainer and adjusted to a brushable viscosity with small amounts of the solvent blend described in Examples 1–7.

Two sets of coatings are prepared by applying two brush coats within 24 hours to 7.5 cm×15 cm low carbon steel panels. All panels are washed with acetone before coating with the anti-corrosive primers made as described above. In addition to the brush coats one set of panels is topcoated with a commercially available white alkyd soybean oil-based paint. The back sides of the panels are coated with a red lead primer and the white alkyd topcoat for general protection. The edges are also coated with the white alkyd topcoat. After conditioning the panels at room temperature, the test side coatings are cut diagonally with a razor blade to the bare metal to form an X configuration to intersect in the center of the panel. They are then exposed at a 45° angle facing south at the location cited above. The coatings are washed off with the previously mentioned solvent and rated according to their ability to prevent corrosion. They are measured along the X cut and rated as described in the previous Examples.

Since it is customary to protect primer coats with one or two topcoats, most emphasis should be given to the set of panels protected with such a topcoat. On the other hand, many steel parts are primer coated prior to delivery to the construction site and are exposed to the atmosphere for many months before a topcoat can be applied. It is extremely important that the shop primer be corrosion inhibiting.

The coatings of these examples are based for simplicity on the strict pigment/binder weight ratio rather than on an equal pigment volume concentration. It is contemplated that optimum formulations can be developed by inclusion of antisettling agents, pigment wetting aids, and additives to prevent flash rusting. While Table III indicates that a few conventional primer coatings are satisfactory after one year outdoor exposure when topcoated, they are no match for the barium pigments listed in Table IV. These pigments indicate practically no rust when exposed under similar conditions. While barium chloranilate (a commercially available reaction product of barium hydroxide with 2,5-dichloro-3,6-dihydroxyquinone, also referred to as chloranilic acid) is used in combination with barium salicylate, it can be used alone or in combination with other barium salts.

EXAMPLES 13–22

Coating compositions prepared as described above containing 60 parts of the Alloprene chlorinated rubber solution described in Examples 1–7 of Table II and coated on steel panels as described in previous examples are exposed as are the test panels of Examples 8–12 of Table IV for a period of 1 year. The concentrations of the conventional pigments and the barium salts are diluted about 50% using calcium carbonate pigment, commercially available from Thompson, Weinman Co. as Sno Flake.

The rust rating tests indicate that the barium salts and combinations thereof inhibit rust to a greater degree than those of the conventional pigment demonstration Q, R, S, and T of Table V.

EXAMPLES 23–26

To demonstrate the effect of the experimental pigment using a water-based emulsion acrylic copolymer "Rhoplex MV-2", a product of Rohm & Haas Corp., a series of coatings using 80 parts Rhoplex with 36 parts of the primer pigment, the compositions of which are shown in Tables VII and VIII are ground in a ball mill at a 1/1 pigment binder ratio using the ball mills previously described. One set of the panels is prepared using two primer brush coats. The second set of panels, in addition to the two primer coats, is coated with one brush coat of white commercial soybean oil based alkyd paint. After conditioning the panels at room temperature for 3 weeks, they are cut diagonally and exposed on a test fence in a heavy industrial atmosphere, as described in Examples 8-22 of Tables IV and VI. After two years exposure they are removed and rust tested as previously described. In Tables VII and VIII is shown the compositions of the invention have practically no rust.

TABLE I

1000 HR. SALT SPRAY CORROSION - CONVENTIONAL PIGMENT PRIMER (Parts Pigment with 60 Parts Chlorinated Rubber Solution)

| Demonstrations | A | B | C | D | E | F | G | H | I |
|---|---|---|---|---|---|---|---|---|---|
| Pigment Primer | | | | | | | | | |
| Red Lead($Pb_3O_4$) | 20 | | | | | | | | |
| Calcium Carbonate | 20 | 20 | 20 | 20 | 20 | 40 | 20 | 20 | 20 |
| Modified Barium Metaborate | | 20 | | | | | | | |
| Zinc Phosphate #317 | | | 20 | | | | | | |
| Calcium-barium Phosphosilicate | | | | 20 | | | | | |
| Calcium-strontium Phosphosilicate | | | | | 20 | | | | |
| Zinc Chromate | | | | | | | 20 | | |
| Basic Lead Silico Chromate | | | | | | | | 20 | |
| Zinc Based Pigment | | | | | | | | | 20 |
| RUST TEST | | | | RUST RATING RESULTS | | | | | |
| mm of Rust along X Scratch | 1-2 | 2-5 | 8 | 0 | 0 | 3-5 | 0 | 1-3 | 5-15 |
| Rust on Surface* | B-C | C | D | D | D | C | D | D | D |

*Code:
B = Edge attack
C = Rust spots + edge attack
D = 50% or greater rust covered

TABLE II

1000 HR. SALT SPRAY CORROSION - EXAMPLES 1-7 PRIMERS (Parts Pigment with 60 Parts Chlorinated Rubber Solution)

| Examples | 1 | 2 | 3 | 4 | 5 | 6 | 7 |
|---|---|---|---|---|---|---|---|
| Primer Compound | | | | | | | |
| Barium Alizarate Prep. 4 | 6 | 2 | 6 | 3 | 3 | | |
| Barium Citrate Prep. 1 | | | | | 3 | | |
| Barium Tartrate Prep. 2 | | | | | | 3 | |
| Barium Quinizarate Prep. 5 | | | | | | 20 | |
| Mixed pigment on inert carrier- Prep 6 (60% Aluminum Trihydrate, 30% Barium Citrate Prep. 1, 10% Barium Alizarate Prep. 4) | | | | | | | 20 |
| Red Lead | 14 | 8 | | | | | |
| Calcium Carbonate | 20 | 30 | 34 | 34 | 34 | 20 | 20 |
| RUST TEST | | | | RUST RATING* | | | |
| mm of Rust along X Scratch | 0-2 | 0-2 | 0-3 | 0-2 | 1-2 | 1-3 | 0-3 |
| Rust on Surface* | A-B | A-B | A-B | A-B | A-B | A-B | B |

*Code:
A = No rust
B = Edge Attack

TABLE III

1 YR. OUTDOOR EXPOSURE - CONVENTIONAL PIGMENTS PRIMERS (Parts Pigment w 60 Pts. Chlorinated Rubber Solution)

| Demonstrations | J | K | L | M | N | O | P |
|---|---|---|---|---|---|---|---|
| Pigment Primer | | | | | | | |
| Red Lead | 40 | | | | | | |
| Calcium Carbonate | | 40 | | | | | |
| Molywhite 101 (Lead free Primer) | | | 40 | | | | |
| Phosphate Zinc Oxide | | | | 40 | | | |
| Boron-Silicate Pigment | | | | | 40 | | |
| Zinc Chromate | | | | | | 40 | |
| Basic Lead Silico Chromate | | | | | | | 40 |
| RUST TEST | | | RUST RATING* (PRIMER COAT) | | | | |
| mm of Rust along X Scratch | 8-10 | 3-5 | 5-20 | 1-8 | 0-12 | 3-5 | 1-4 |
| Rust on Surface* | C | D | D | C | B | C | B |
| | | | (PRIMER TOP COAT) | | | | |
| mm of rust along X scratch | 3-5 | 1-3 | 5-20 | 1-2 | 1-2 | 1-2 | 1-3 |

TABLE III-continued

1 YR. OUTDOOR EXPOSURE - CONVENTIONAL PIGMENTS PRIMERS (Parts Pigment w 60 Pts. Chlorinated Rubber Solution)

| Demonstrations | J | K | L | M | N | O | P |
|---|---|---|---|---|---|---|---|
| Rust on Surface* | C | B-C | D | B | A-B | B-C | B-C |

*Code:
A = No rust
B = Edge attack
C = Rust spots + edge attack
D = 50% or greater rust covered

TABLE IV

1 YR. OUTDOOR EXPOSURE - EXAMPLES 8-12 PRIMER

Parts Pigment w 60 Pts. Chlorinated Rubber Solution)

| Examples | 8 | 9 | 10 | 11 | 12 |
|---|---|---|---|---|---|
| Pigment Primer | | | | | |
| Barium Citrate Prep. 1 | 40 | 34 | | | |
| Barium Alizarate Prep. 4 | | 6 | | | 40 |
| Barium Salicylate Prep. 3 | | | 40 | 34 | |
| Barium Chloranilate (Commer. avail) | | | | 6 | |
| RUST TEST | | | RUST RATING* (PRIMER COAT) | | |
| mm of Rust along X Scratch | 1 | 0 | 1 | 1 | 0 |
| Rust on Surface* | A-B | A | D | D | A |
| | | (PRIMER & TOP COAT) | | | |
| mm of Rust along X Scratch | 1 | 0 | 0 | 0 | 0 |
| Rust on Surface* | A-B | A | A-B | A | A |

*Code:
A = No rust
B = Edge attack
C = Rust spots + edge attack
D = 50% or greater rust covered

TABLE V

1-YEAR OUTDOOR EXPOSURE CONVENTIONAL PIGMENT PRIMER WITH CALCIUM CARBONATE (Parts w 60 Pts. Chlorinated Rubber Solution)

| Demonstrations | Q | R | S | T |
|---|---|---|---|---|
| Pigment Primer | | | | |
| Red Lead | 20 | | | |
| Calcium Carbonate | 20 | 20 | 20 | 40 |
| Buson 11-M-1 | | 20 | | |
| Zinc Phosphate | | | 20 | |
| | | RUST RATING* | | |
| RUST TESTS | (PRIMER COAT) | | | |
| mm of Rust along X Scratch | 8-10 | 1-2 | 1-2 | 1-2 |
| Rust on Surface* | D | D | D | D |
| | (PRIMER + TOP COAT) | | | |
| mm of Rust along X Scratch | 1-3 | 1-3 | 1 | 1-3 |
| Rust on Surface* | C | C | B | C |

*Codes:
A = No rust
B = Edge attack
C = Rust spots + edge attack
D = 50% or greater rust covered

TABLE VI

1 YEAR OUTDOOR EXPOSURE - EXAMPLES 13-22 WITH CALCIUM CARBONATE

| Examples | 13 | 14 | 15 | 16 | 17 | 18 | 19 | 20 | 21 | 22 |
|---|---|---|---|---|---|---|---|---|---|---|
| Pigment Primer | | | | | | | | | | |
| Barium Alizarate Prep. 4 | 6 | | 6 | | | | 20 | 6 | 6 | 6 |
| Barium Citrate Prep. 1 | | 20 | 20 | 20 | 20 | 20 | | | | |
| Barium Quinizarate Prep. 5 | | | | 6 | | | | | | |
| Barium Salicylate Prep. 3 | | | | | | | | 20 | | |
| Barium Tartrate Prep. 2 | | | | | | | | | 20 | |
| Alizarine | | | | | 6 | | | | | |
| Benzoquinone | | | | | | 6 | | | | |
| Calcium carbonate | 34 | 20 | 14 | 14 | 14 | 14 | 20 | 14 | 14 | 14 |
| Red Lead | | | | | | | | | | 20 |
| RUST TEST | | | | RUST RATING* (PRIMER COAT) | | | | | | |
| mm of Rust along X Scratch | 3-5 | 1 | 0 | 1 | 0 | 0 | 0 | 2 | 3-5 | 3-5 |
| Rust on Surface* | D | D | A | A | A | A | A | C | C | C-D |
| | | | | (PRIMER & TOP COAT) | | | | | | |
| mm of Rust along X Scratch | 1-3 | 1 | 1 | 1 | 1 | 1 | 0 | 1-2 | 1 | 1-3 |
| Rust on Surface* | C | B | A-B | A-B | A-B | A-B | A | B | B | C |

*Code:
A = No rust
B = Edge Attack
C = Rust spots + edge attack
D = 50% or greater rust covered

TABLE VII

2 - YR. OUTDOOR EXPOSURE CONVENTIONAL PIGMENTS PRIMER (Parts w 80 Pts. Acrylic Copolymer)

| Demonstrrations | U | V | W | X | Y |
|---|---|---|---|---|---|
| Pigment Primer | | | | | |
| Red Lead | 36 | | | | |
| Molywhite 212 | | 36 | | | |
| Zinc Phosphate Complex | | | 35 | | |
| Borosilicate Pigment | | | | 36 | |
| Calcium Carbonate | | | | | 36 |
| | RUST RATING* | | | | |
| RUST TESTS | (PRIMER COAT) | | | | |
| mm Rust along X scratch | 1-3 | 1-3 | 2-5 | 2-5 | 1-3 |
| Rust on Surface* | C | C | C | C | C |
| | (PRIMER & TOP COAT) | | | | |

TABLE VII-continued
2 - YR. OUTDOOR EXPOSURE CONVENTIONAL PIGMENTS PRIMER

| Demonstrrations | (Parts w 80 Pts. Acrylic Copolymer) | | | | |
|---|---|---|---|---|---|
| | U | V | W | X | Y |
| mm Rust along X Scratch | 2-4 | 1-6 | 1 | 1-2 | 1-3 |
| Rust on Surface* | B-C | B | A-B | C | C |

*Code:
A = No rust
B = Edge attack
C = Rust spots + edge attack
D = 50% or greater rust covered

TABLE VIII
2-YEAR OUTDOOR EXPOSURE - EXAMPLES 23-26

| Examples | 23 | 24 | 25 | 26 |
|---|---|---|---|---|
| Pigment Primer | | | | |
| Barium Citrate Prep. 1 | 36 | 30 | | |
| Barium Chloranilate | | 6 | | |
| Barium Alizarate Prep. 4 | | | 36 | 6 |
| Barium Tartrate Prep. 2 | | | | 30 |
| RUST TESTS | (PRIMER COAT) | | | |
| mm of Rust along X Scratch | 0 | 0 | 0-1 | 0 |
| Rust on Surface* | B | A-B | A-B | A |
| | (PRIMER & TOP COAT) | | | |
| mm of Rust along X Scratch | 0 | 0 | 0-1 | 0 |
| Rust on Surface* | B | A-B | A-B | A |

*Code:
A = No rust
B = Edge attack
C = Rust spots + edge attack
D = 50% or greater rust covered

What is claimed is:

1. In a corrosion-inhibiting coating composition for metallic surfaces which consists essentially of a film forming binder system selected from the group consisting of an acrylic resin, alkyd resin, epoxy resin, polyvinyl acetate, rubber latex and chlorinated rubber, and a corrosion-inhibiting agent; the improvement consisting of having dispersed therein, as said corrosion-inhibiting agent, a substantially water insoluble barium salt of an organic carbonyl group containing compound having 2-40 carbon atoms and at least one acidic hydrogen, said compound being selected from the group consisting of aliphatic and aromatic compounds having at least one hydroxyl group in the beta position to at least one carbonyl group when separated by saturated carbon linkages according to the following structure:

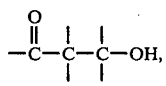

at least one hydroxyl group in the gamma position to at least one carbonyl group when separated by an ethylenically unsaturated carbon linkage according to the following structure:

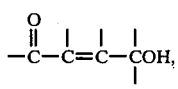

and at least one hydroxyl group in the $\beta$, $\Delta$ or $\gamma$ positions to at least one carbonyl group when separated by aromatic unsaturation according to the following structure:

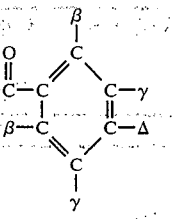

and wherein said carbonyl group is present as part of an aldo, keto, carboxyl, carboxy ester or amido group and wherein said barium salts are precipitated from solutions of basic barium compounds.

2. A pigment for use in corrosion inhibiting surface coatings which comprises a particulate substrate having deposit thereon a substantially water insoluble barium salt of an organic carbonyl group containing compound having 20-40 carbon atoms and having at least one acidic hydrogen said compound selected from the group consisting of an aliphatic and aromatic compound having at least one hydroxyl group in a $\beta$ position to at least one carbonyl group and separated by saturated carbon linkages according to the following structure:

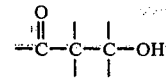

at least one hydroxyl group in the $\gamma$ position to at least one carbonyl group when separated by an ethylenically unsaturated linkage according to the following structure:

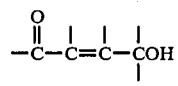

and at least one hydroxyl group in the $\beta$, $\Delta$ or $\gamma$ positions to at least one carbonyl group when separated by aromatic unsaturation according to the following structure:

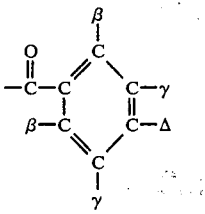

and wherein said carbonyl group is present as part of an aldo, keto, carboxyl, carboxy ester or amido group.

3. A composition of claim 2 wherein said organic carbonyl group containing compound has a molecular weight in the range of 73-350.

4. A composition of claim 2 wherein said carbonyl group containing compound is selected from the group consisting of citric acid, tartaric acid, salicylic acid, alizarine, quinizarine, chloranilic acid, alizarine carboxylic acid, glutaric acid, glycolic acid, glyceraldehyde, glyceric acid, malic acid, gluconic acid and $\beta$-hydroxy propanoic acid.

5. A composition of claim 2 having at least 0.1 percent by weight barium.

6. A composition of claim 2 wherein said inert substrate is selected from clay, silica, alumina, aluminum trihydrate, carbon, glass, inorganic pigments and organic resins.

7. A composition of claim 6 wherein said substrate is aluminum trihydrate and said salt is a mixture of barium citrate and barium alizarate.

8. A process for inhibiting corrosion upon a metal surface which comprises treating the metal surface with a coating composition containing a corrosion inhibiting amount of the pigment of claim 2.

9. A coating composition of claim 1 wherein said barium salt is a barium salt of a compound selected from the group consisting of alizarine, quinizarine, chloranilic acid and alizarine carboxylic acid.

10. A coating composition of claim 9 further including another and different substantially water insoluble barium salt of an organic carbonyl group containing compound having 2–40 carbon atoms and at least one acidic hydrogen said compound selected from the group consisting of an aliphatic and aromatic compound having at least one hydroxyl group in the β position to at least one carbonyl group when separated by saturated carbon linkages according to the following structure:

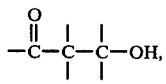

at least one hydroxyl group in the γ position to at least one carbonyl group when separated by an ethylenically unsaturated carbon linkage according to the following structure:

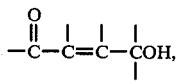

and at least one hydroxyl group in the β, Δ or γ positions to at least one carbonyl group when separated by aromatic unsaturation according to the following structure:

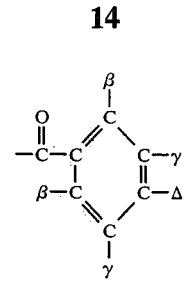

and wherein said carbonyl group is present as part of an aldo, keto, carboxyl, carboxy ester or amido group.

11. A pigment composition of claim 4 further including another and different substantially water insoluble barium salt of an organic carbonyl group containing compound having 2–40 carbon atoms and having at least one hydroxyl group in the Greek letter β position to at least one carbonyl group when separated by saturated carbon linkages according the following structure:

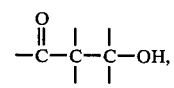

at least one hydroxyl group in the γ position to at least one carbonyl group when separated by an ethylenically unsaturated linkage according to the following structure:

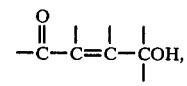

and at least one hydroxyl group in the β, Δ or γ position to at least one carbonyl group when separated by aromatic unsaturation according to the following structure:

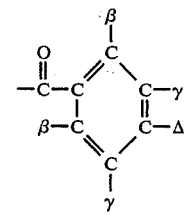

and wherein said carbonyl group is present as part of an aldo, keto, carboxyl, carboxy ester or amido group.

* * * * *

UNITED STATES PATENT AND TRADEMARK OFFICE
CERTIFICATE OF CORRECTION

PATENT NO. : 4,304,707
DATED : December 8, 1981
INVENTOR(S) : Erich Kuehn

It is certified that error appears in the above-identified patent and that said Letters Patent are hereby corrected as shown below:

Column 8, Table I, "RUST RATING RESULTS" should read --RUST RATING RESULTS*--.

Column 8, Table III, under column N, "0-12" should read --1-2--.

Column 8, Table III, under column O, "3-5" should read --3-6--.

Column 8, Table III, "(PRIMER TOP COAT)" should read --(PRIMER & TOP COAT)--.

Column 10, Table VII, under column W, "35" should read --36--.

Column 12, line 19, "20-40" should read --2-40--.

Signed and Sealed this

Twenty-second Day of June 1982

[SEAL]

Attest:

Attesting Officer

GERALD J. MOSSINGHOFF

Commissioner of Patents and Trademarks